March 24, 1970 C. F. PAVLIN ETAL 3,502,288
MISSILE-PILOTING SYSTEM
Filed March 21, 1967 6 Sheets-Sheet 1
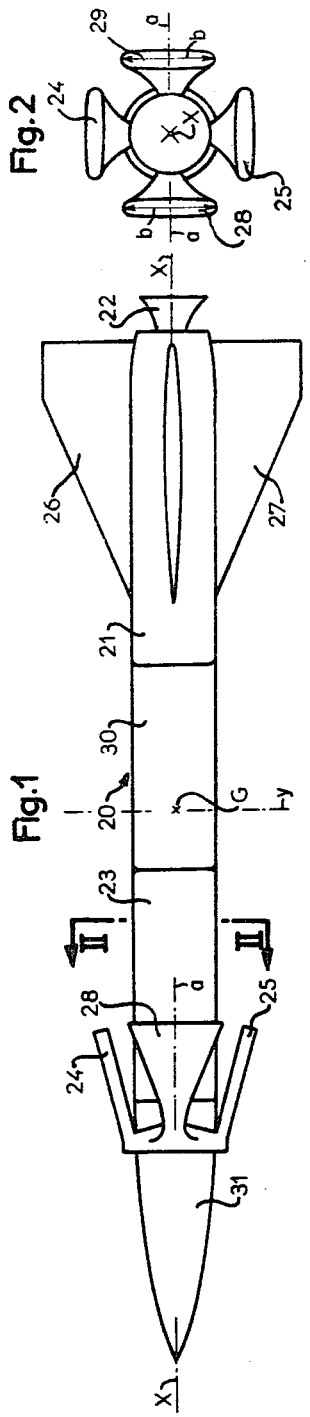
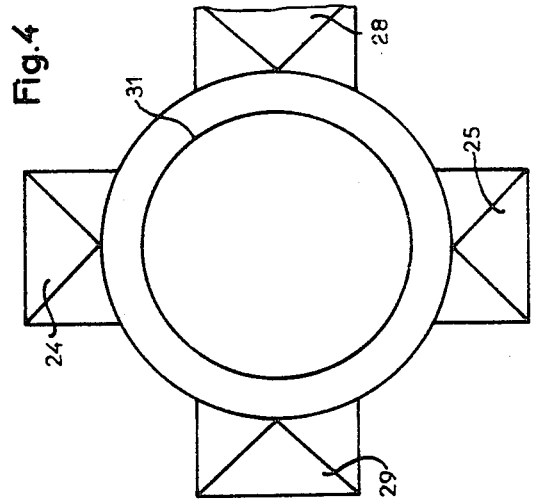
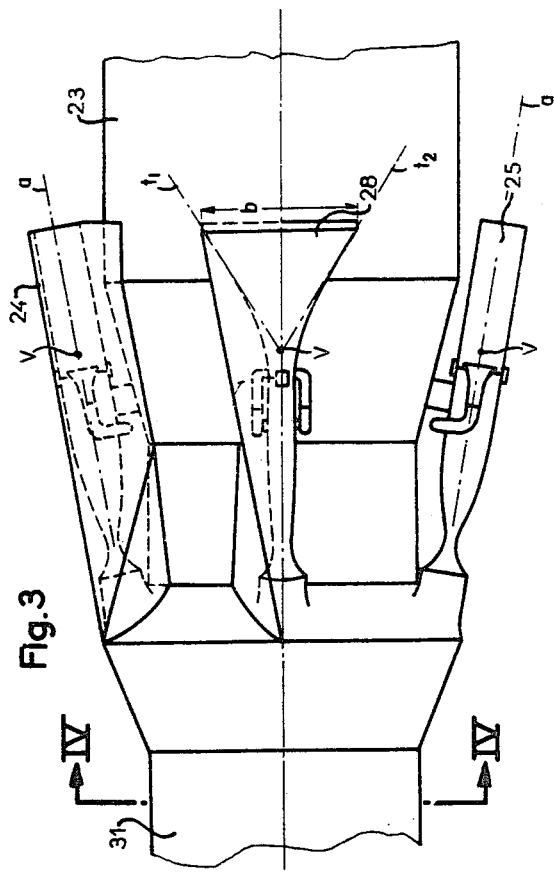
Cyrille, Francois PAVLIN
Francois, Charles OUDIN
INVENTORS
Karl F. Ross
Attorney March 24, 1970  C. F. PAVLIN ETAL  3,502,288
MISSILE-PILOTING SYSTEM
Filed March 21, 1967  6 Sheets-Sheet 2
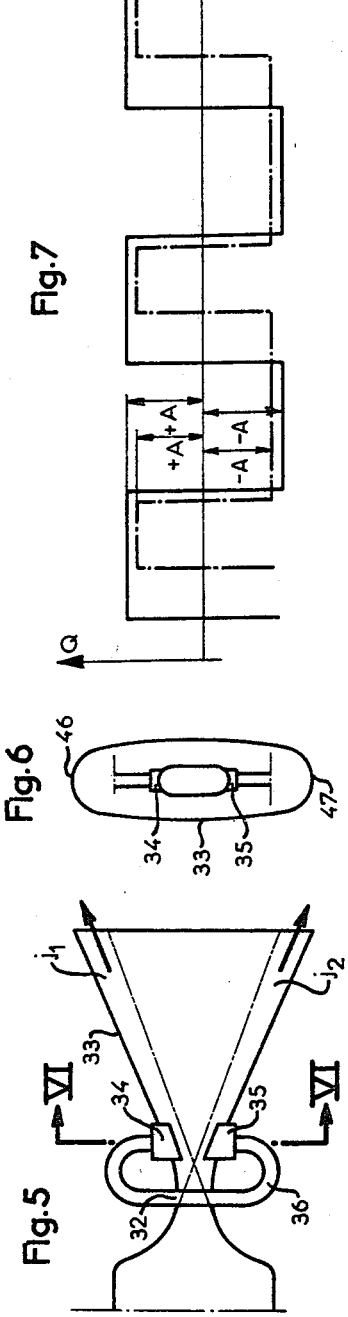
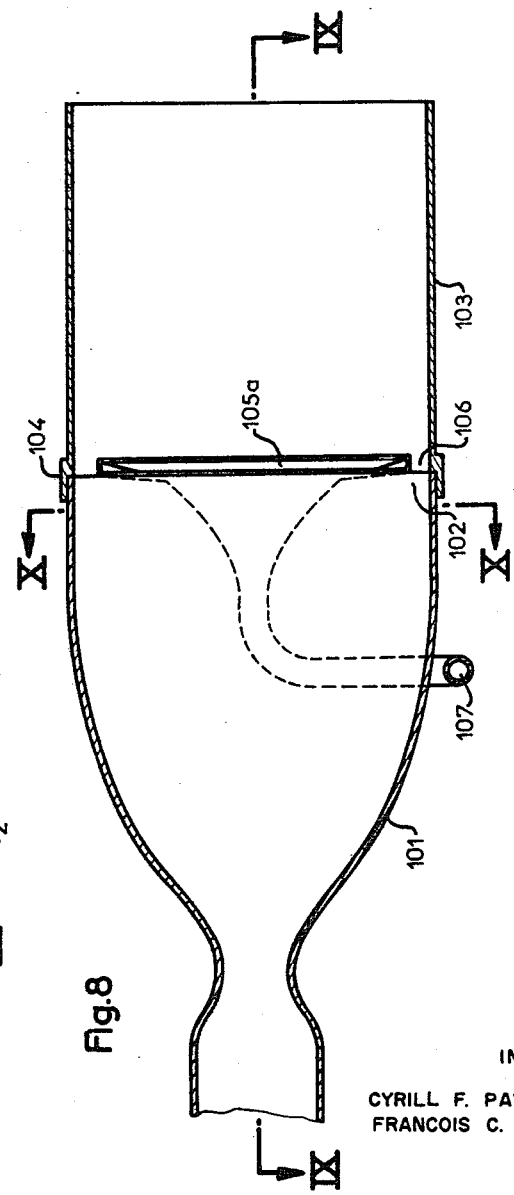
INVENTORS
CYRILL F. PAVLIN
FRANCOIS C. OUDIN

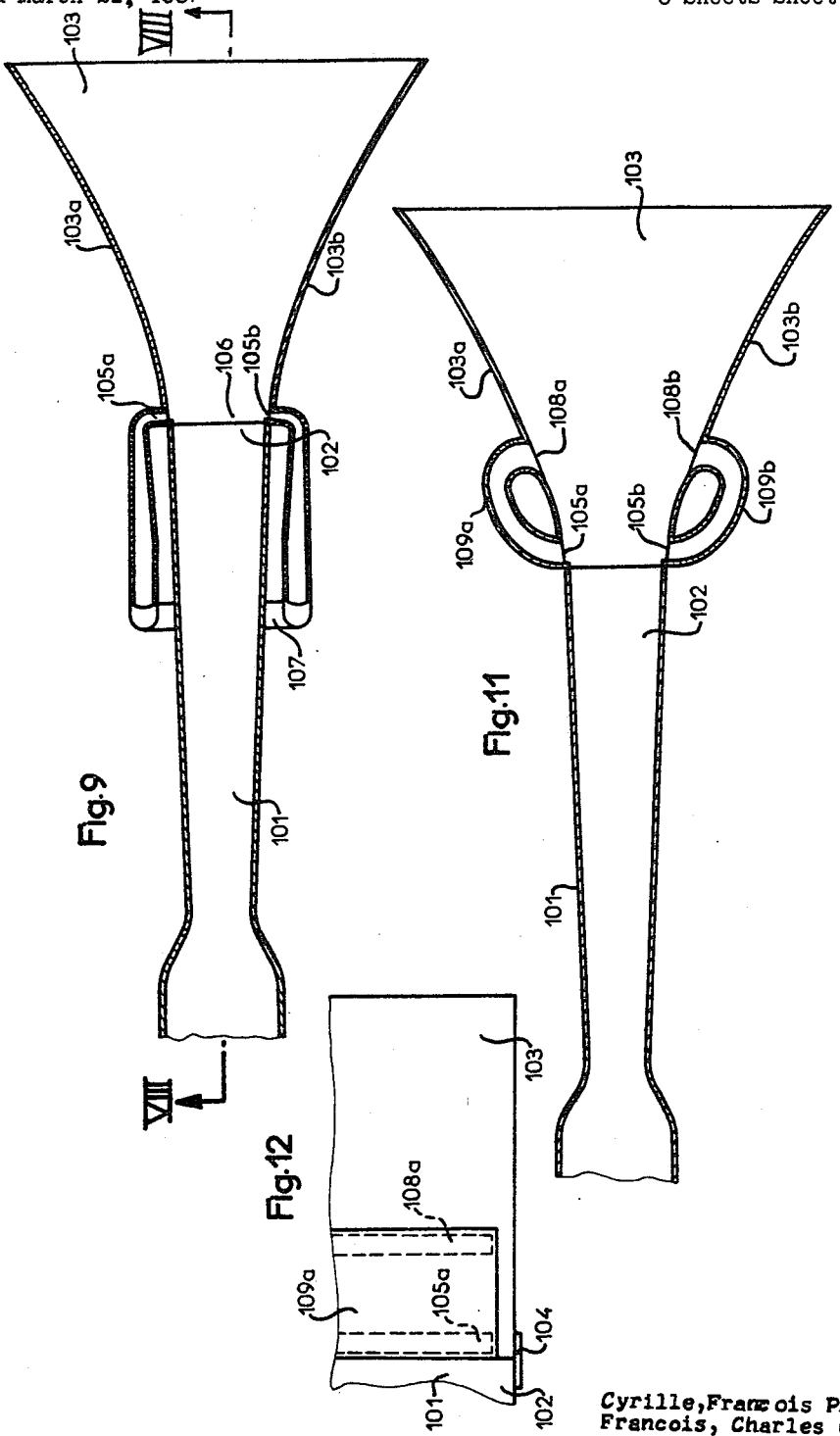

Cyrille, F. PAVLIN
Francois, C. OUDIN
INVENTORS

Karl F. Ross
Attorney

March 24, 1970 — C. F. PAVLIN ET AL — 3,502,288
MISSILE-PILOTING SYSTEM
Filed March 21, 1967 — 6 Sheets-Sheet 5

Cyrille, F. PAVLIN
Francois, C. OUDIN
INVENTORS

Karl F. Ross
Attorney

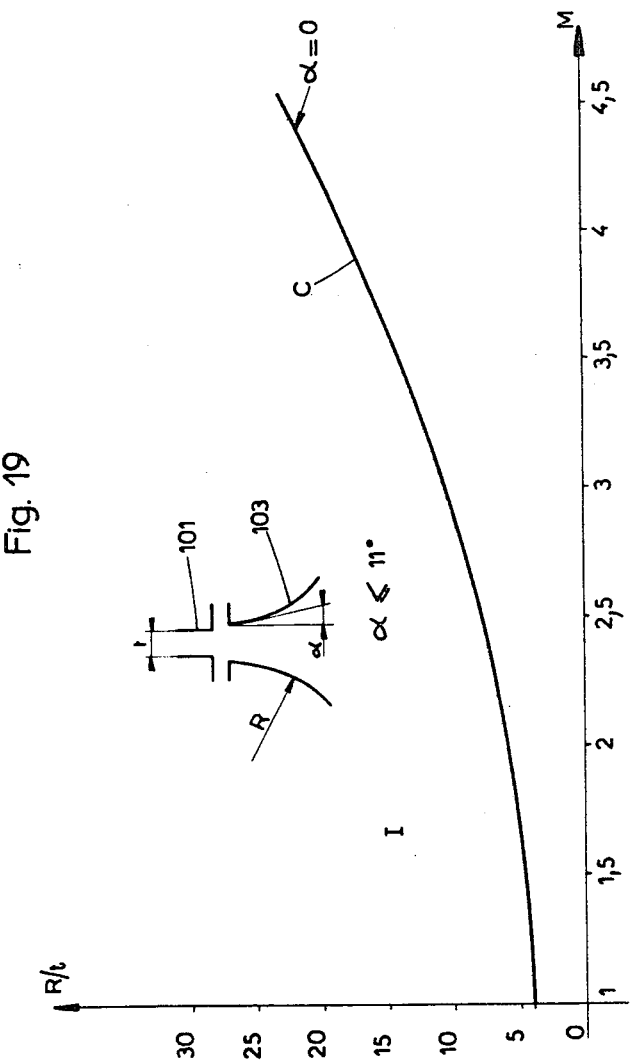

3,502,288
MISSILE-PILOTING SYSTEM
Cyrille François Pavlin, Saclay, and François Charles Oudin, Noisy-le-Roi, France, assignors of one-half to Bertin & Cie, Paris, France, and one-half to Engins Matra, Paris, France, both a corporation of France
Filed Mar. 21, 1967, Ser. No. 624,813
Claims priority, application France, Mar. 22, 1966, 54,510
Int. Cl. B64g 1/20
U.S. Cl. 244—73          16 Claims

ABSTRACT OF THE DISCLOSURE

The attitude of a missile or other flying body is controlled by pairs of bistable nozzles disposed on opposite sides of the longitudinal axis of the body, the nozzles of each pair being flattened so that their outlet ends have parallel major dimensions extending transversely to a common axial plane and defining with the respective nozzle axes two rearwardy diverging planes in which the fluid jets discharged by these nozzles periodically swing between alternate positions along lines skew to the longitudinal body axis. For a veering motion about the pitch or yaw axis, the jet oscillations of a corresponding nozzle pair are modulated in parallel so that the average residence time of both jets is lengthened on one side of their common axial plane and commensurately shortened on the opposite side; for a rolling motion about the longitudinal axis, the jet oscillations of a pair of nozzles are modulated in mutual opposition so that the lengthened residence time of one jet on one side of the common axial plane is accompanied by a lengthened residence time of the other jet on the opposite side of that plane. Modulation may be accomplished by passing an asymmetrical biasing flow through a conduit system carrying a control fluid to a pair of lateral ports provided on opposite nozzle walls diverging, preferably along curves that are convex to the nozzle axis, in the plane of swing of its jet.

---

The present invention relates to a system for piloting a missile.

Missiles can be maneuvered by using the aerodynamical forces which appear upon deflection of mobile surfaces called flaps. Superimposed upon the resulting moment of these aerodynamical forces, acting on the flaps, are forces acting on nonmobile surfaces, and the resultant of all these forces has a normal component relative to the speed of the missile, which entails the incurvation of its trajectory. This guiding device can only be effective when in the presence of sufficient dynamic pressure of the air in which the missile is moving.

On the other hand, one can use for the guidance of a missile the modification in space of the direction of a force obtained through the reaction effect of the discharge of gas under pressure. This is the only suitable means for guiding the missile when the dynamic pressure of the air is very low.

One can also use the lateral component of a force produced by a gas discharge which, in association with the aerodynamical moments resulting from forces applied to fixed lifting surfaces, gives a rise to a lateral component which results in the incurvation of the trajectory, as in the case of aerodynamical flaps.

As the gas-outlet nozzles are generally located at the rear end of the missile, the orientation of the force resulting from the gas discharge, either through mechanical means for directing these nozzles, through insertion of solid baffles or else by the injection of a secondary fluid into these nozzles, leads, inasmuch as the controlling lateral component is on the opposite side of the desired effect, to a guiding system called "non-minimal phase shift" whose performance, as far as speed of response is concerned, is basically limited.

An object of the present invention is to provide a missile-piloting system which is efficient for dynamic air pressures over a very wide range of values, from zero to very large magnitudes, without basic limitations as to the speed of response.

A further object of the invention is to provide a missile-piloting system which will allow a missile having a set direction at the start to change its course to any other direction immediately after its start.

It is also an object of the invention to achieve both these facilities without increase in mass or in consumption of propellent fluid as compared with a conventional system, comprising aerodynamical flaps, which, in any case efficient only at high dynamic pressures and does not permit directional modifications as long as the missile has not gathered up enough speed.

It is still another object of the invention to provide a piloting device which can be applied generally to all types of missiles for which it is important to obtain ample and rapid evolutions at high speed in a very widespread range of dynamic pressures and for which available space and the charge carried give rise to critical problems.

The invention is characterized by the utilization, for controlling the evolutions of a missile, of at least one so-called bistable nozzle whose axis is substantially co-directional with the principal axis of the missile, the relative times of gas discharged in one and the other of the two stable nozzle positions being modifiable according to the evolution to control.

It contemplates, particularly, the application of such a nozzle providing a propulsion force whose point of attack is located ahead of the center of gravity of the missile. One thus obtains a minimal-phase-shift piloting system.

In accordance with a feature of our invention, such a piloting system comprises a plurality of bistable nozzles which may be fed from an engine located adjacent said nozzles.

More particularly, we provide a missile in which said nozzles are located as far forward as possible on the missile, in any case ahead of the center of gravity of the latter.

Another feature is the provision of a selective distributor allowing the control of the mean deflection of the jet of each of the nozzles.

The invention also contemplates the combination of said nozzles with lifting surfaces disposed in such a manner that the aerodynamical center of the missile taken as a unit be in the vicinity of the center of gravity of the latter.

A missile embodying our invention, comprising a jet engine with nozzles designed to permit the guiding of the missile even at zero or very low dynamic pressure, may include a complementary engine located in a conventional manner at the rear of the missile.

At a higher dynamic pressure, such a system allows the guiding of the missile through the generation of lifting aerodynamical forces on the fixed surfaces, there forces being added to the lateral components of the thrust resulting from the bistable nozzles.

The following description with reference to the appended drawing, given as a nonlimiting example, will clearly explain the various features of the invention and the means for accomplishing the same. In the drawing: appearing from the description as well as from the figures being naturally considered as being within the scope of said invention.

FIGURE 1 is a schematic view of a missile equipped with a piloting system according to the invention;

FIGURE 2 is a cross-sectional view along line II—II of FIG. 1;

FIGURE 3 is a partial view on a larger scale of part of the missile according to FIG. 1;

FIGURE 4 is a cross-sectional view along line IV—IV of FIG. 3;

FIGURE 5 is a schematic view of a bistable nozzle;

FIGURE 6 is a cross-sectional view along line VI—VI of FIG. 5;

FIGURE 7 is a diagram;

FIGURES 8 and 9 are longitudinal sections of a nozzle combination according to the invention, FIGURE 8 being a section along line VIII—VIII of FIGURE 9 and, conversely, FIGURE 9 being a section along line IX—IX of FIGURE 8;

FIGURE 10 is a cross-sectional view along line X—X of FIG. 8;

FIGURE 11 is a longitudinal section similar to FIGURE 9 but embodying a modification;

FIGURE 12 is a partial plan view, from above, of this same modified embodiment;

FIGURE 19 is a diagram.

Figure 13:
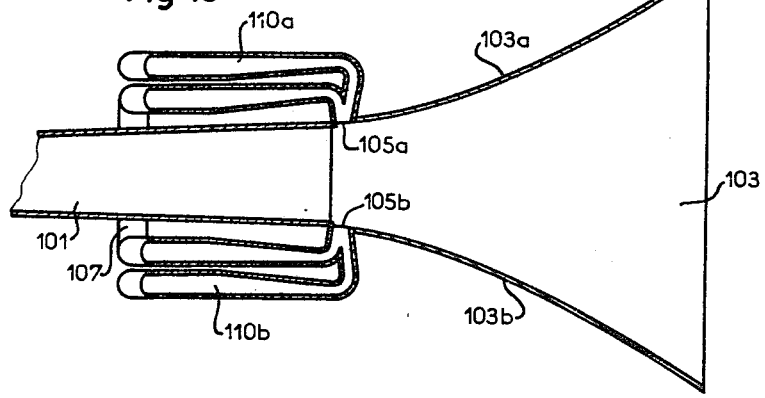
FIGURES 13, 14 and 15 are longitudinal sections taken in the same plane as FIGS. 9 and 11 but relating to various embodiments of the control system.

A missile according to the invention comprises, in the embodiment illustrated in FIGURES 1 to 4, a body 20 which houses, at its rear end, a jet engine 21 whose nozzle is indicated at 22 and which is provided to furnish the desired initial acceleration, the engine 21 normally working only for a relatively short period of time. Ahead of the center of gravity G of the missile, the latter comprises a cruising engine 23 whose reaction gases are discharged ahead of the center of gravity G of the missile by four nozzles 24, 25 and 28, 29 angularly equispaced about the longitudinal or roll axis $x$ of the missile. In FIG. 1 the pitch axis of the missile coincides with point G, the yaw axis being shown at $y$.

Rearwardly of the center of gravity of the missile there are lifting surfaces 26, 27. An equipment receiving compartment 30 is provided between the two engines 21, 23 and the guiding equipment is located in a compartment 31 positioned in the front end, or nose, of the missile.

Each one of the nozzles 24, 25, 28, 29 is designed to emit a jet in either of two stable positions.

The nozzles are basically identical. The cross section of each nozzle is elongated, e.g. approximatively elliptical with a major axis appreciably longer than the minor axis, the angle of divergence being thus defined by the width of that major axis. Downstream of the neck 32 (FIG. 5) of each nozzle there are provided in the wall 33 of the latter, in the plane containing the major axis of the cross sections, parts 34 and 35 traversing sharply curved portions 46 and 47 of wall 33, these ports being interconnected by means of a conduit 36.

All the nozzles 24, 25 and 28, 29 are constructed in a similar manner, and a source of pressurized gas can be common to all nozzles. This source can be constituted by a tank of high-pressure gas or by a gas generator operating by combustion of a solid propellant. The rate of fuel consumption is relatively low, for which reason our improved missile has a rating comparable to that of a missile equipped with streamline flaps while being of much higher efficiency.

The operation is as follows:

The missile progresses under the action of its rear engine and of its forward engine or under the action of the latter alone. In each nozzle, the power jet passes alternatively from the position indicated at $j_1$ in FIGURE 5, where it hugs the sharply curved portion 46 of wall 33, to the position illustrated at $j_2$ where is clings to the diametrically opposite portion 47. Because of pressure variations transferred from one port to the other through conduit 36, the nozzle thus acts in a manner similar to that of a multivibrator; the commutation frequency depends on the shape of the nozzle, on the speed of the propellant jet, and on the length and diameter of conduit 36. When the jet flow times in positions $j_1$ and $j_2$ are equal, the nozzle performance can be schematically illustrated as indicated in full lines in FIGURE 7 in which time T is plotted on the abscissa and the ordinates represent the mass flow Q of the jet, the positive peaks A corresponding to the jet flow in the $j_1$ position and the negative peaks $(-A)$ corresponding to the jet flow in the $j_2$ position. The jet flow times in these positions are then equal, so that the average effect of the nozzle is a purely longitudinal thrust without transverse component. When the four nozzles and their subsidiaries are in this condition, the thrust exerted by engine 23, is thus a longitudinal force directed along the axis of the missile.

If, for one of the nozzles, the residence time of the jet in one position, e.g. along wall portion 47 in the $j_2$ position, is lengthened by appropriate means in relation to that in the other position, (e.g. $j_1$), the nozzle performance is the one illustrated in broken lines in FIGURE 7 in which, for the sake of clarity, the peaks have been slightly offset from those of the full-lines graph although, in fact, they have the same ordinates $\pm A$. The nozzle then exerts not only a longitudinal thrust but also a transverse force which modifies the trajectory of the missile. This modification is all the more pronounced as the inequality between the residence times in the two jet positions is increased.

The nozzle thus performs, in addition to its propulsion role, a piloting function.

The system according to our invention comprises means for periodically discharging the control flow from one of the curved walls at a constant rate, which can be considered as a relaxation oscillation, is set at a much higher value than the natural frequency of the movements of the missile about its center of gravity. The position of the nozzles ahead of the center of gravity of the missile, in combination with the jet-shifting system, allows the piloting of a missile in a far more efficient manner than was possible up to now.

The combination of the actions of nozzles 28, 29 and 24, 25 allows selective control of yawing, rolling and pitching, i.e. a desired variation in attitude and spin. For yaw control the jets of the two vertically spaced nozzles 24 and 25 are switched in the same sense, whereas mutually opposite switching is used for rolling control.

The nozzles are located ahead of the center of gravity; thus, the transverse component supplied by the horizontally spaced nozzles 28 and 29, when it is desired for the missile to nose up, is added to the lifting forces.

As will be apparent from FIGS. 1–3, the individual axes $a$ of each pair of diametrically opposite nozzles 24, 25 or 28, 29 define with the longitudinal axis $x$ of body 20 a common axial plane perpendicular to the major dimension $b$ of the flattened outlet end of each nozzle of the pair whose shape will be described in greater detail hereinafter. It will further be seen that the jet of each nozzle, in alternating between its two stable positions $j_1$ and $j_2$, swings in a plane which diverges toward the rear of the missile from the axis $x$, and therefore also from the corresponding swing plane of the nozzle paired with it; since the vertex V of the angle defined by the tangents $t_1$, $t_2$ (FIG. 3) to the convex inner wall surfaces of each nozzle at opposite ends of its flattened outlet is offset from the roll axis $x$, and since these tangents approximately coincide with the vectors $j_1$, $j_2$ (FIG. 5) representing the thrust of the jet in its alternate stable positions, the direction of this thrust is skew to the axis x.

With the jets of nozzles 28 and 29, for example, both predominantly trained downwardly so as to have a greater average residence time below their common axial plane a–x–a than above that plane, the missile will head up; similarly, with the jets of nozzles 24 and 25 predominantly directed to one side of their common (vertical) axial plane, e.g. to the right thereof, the missile will veer to the opposite side, i.e. to the left. The torque producing a rolling motion is generated if the lengthened residence time of the jet of one nozzle on one side of the common plane is accompanied by a lengthened residence time of the jet of its companion nozzle on the opposite side of that plane, this being accomplished by the aforedescribed modulation of the oscillation of these jets in mutual opposition.

The piloting system can be advantageously applied to missiles designed for the interception of airborne vehicles, whether they are fired from the ground or from a plane, and also to any missile whose trajectory is to be modified, even when its aerodynamical flaps are ineffectual, as when its speed is still relatively low.

FIGURES 8 through 18 show, in more detail, types of nozzles capable of ensuring the propulsion and the guiding of missiles as described above. When these nozzles are used in this manner, their dimension parallel to the swing plane of the jet is, preferably, substantially smaller than their dimension normal to that plane.

In FIGURES 8 to 10 we have illustrated a nozzle combination adapted to generate a symmetrically oscillating jet and basically composed of:

(a) A divergent nozzle 101 discharging a power jet at high, possibly supersonic speed. This nozzle is substantially two dimensional, i.e. flattened, in the vicinity of its outlet opening 102 as clearly indicated in FIGURE 10. This nozzle, in FIGURES 8 to 18, is common to all the illustrated embodiments.

(b) A flattened nozzle 103 with outwardly flared, strongly divergent walls 103a, 103b connected to the upstream nozzle 101 by a socket joint at 104 and fixed to the latter. Nozzle 103 includes two control ports 105a, 105b cut, respectively, in each of the diverging walls 103a, 103b in the vicinity of its inlet end 106, the confronting surfaces of these walls being convex toward the nozzle axis.

(c) A conduit 107 interconnecting the two control ports 105a and 105b.

In this embodiment, an automatic and symmetrical jet oscillation occurs; this jet flows alternatively along one and the other of the diverging walls 103a, 103b of nozzle 103. The change of position of the jet takes place under the influence of an alternating secondary fluid flow created in the connecting conduit by the difference of the pressures existing on opposite sides of the jet, this secondary flow in turn giving rise to alternating pressure differentials across the central nozzle axis whereby the jet is oscillated in its swing plane as is well known per se.

In the modification of FIGURES 11 and 12, the aforedescribed diverging nozzle 101 is again present. The highly divergent flattened nozzle 103 comprises in each of its diverging walls 103a, 103b, in addition to a control port 105a, 105b, an intake port 108a, 108b located downstream of the corresponding control port.

Two looped control conduits 109a, 109b each connect a respective intake port to the associated control port.

Here again, the jet passes alternately and automatically from one wall of the flattened nozzle to the other under the influence of secondary flows or control jets branched off the power jet, owing to the dynamic pressure of the latter.

At the upstream edge of the intake ports, the walls of the flattened nozzle are curved to merge with those of the control conduits so as to reduce the losses of dynamic pressure at the intake to a minimum.

To obtain an unsymmetrical oscillation, i.e. different jet flow times along the two walls 103a, 103b, it is enough to superimpose on the control jets issuing from one side of the nozzle an auxiliary fluid flow which may be permanent. The embodiments in FIGURES 13 to 18 comprise devices for making the jet oscillation asymmetrical to a desired extent including, as a limiting case, the total blocking of the drive jet at one or the other of the diverging walls.

In the example illustrated in FIGURE 13, there is found again the combination described with reference to FIGURES 8 to 10 supplemented, however, by individual control conduits 110a, 110b each opening opposite a respective control port 105a or 105b.

When it is required that the jet cling to one wall for a shorter time than to the other, a fluid flow is caused to pass through the individual conduit 110a or 110b associated with this wall.

The difference in the adherence times depends on the relative magnitudes of the flows of the auxiliary or biasing fluid stream and of the control jet or secondary fluid stream delivered by the connecting tube or conduit 107.

The permanent fluid stream can be delivered and its flow controlled by a conventional hydraulic or pneumatic distributor which may be manually or automatically remote-controlled by means also known.

Figure 14:
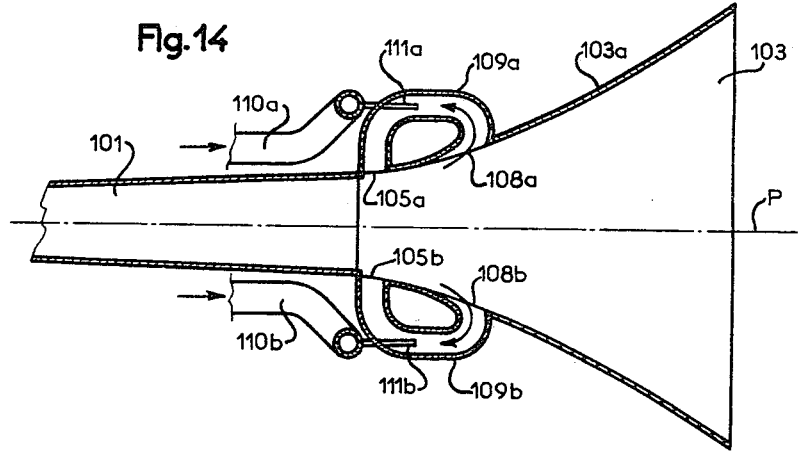

In FIGURE 14 we have reproduced the embodiment described in connection with FIGURES 11 and 12, to which have been added two individual conduits 110a, 110b supplying a plurality of injectors 111a, 111b extending substantially parallel to the plane P of symmetry of the nozzles. These injectors open into the looped control circuits 109a, 109b nearly along the axis of the control flow and, in the illustrated example, in an opposite direction to the latter.

Under these conditions, the permanent biasing flow will increase the time of adherence of the jet to the wall adjacent the conduit to which it is admitted.

If the injectors were oriented in the direction of flow of the control jet, the permanent stream would diminish the adherence time of the jet on the wall adjacent the conduit to which it is admitted.

The difference between the adherence times depends here, as in the preceding example, on the relative magnitudes of the flows of the control jet and of the permanent stream.

The permanent stream can also be delivered and adjusted as in the preceding example.

Figure 15:
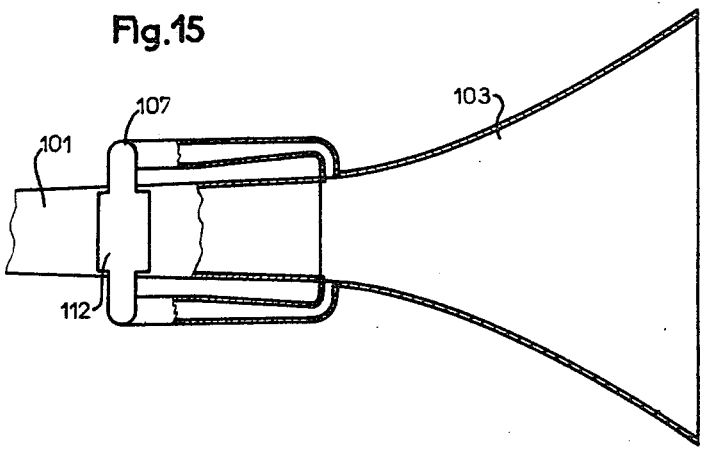
Figure 16:
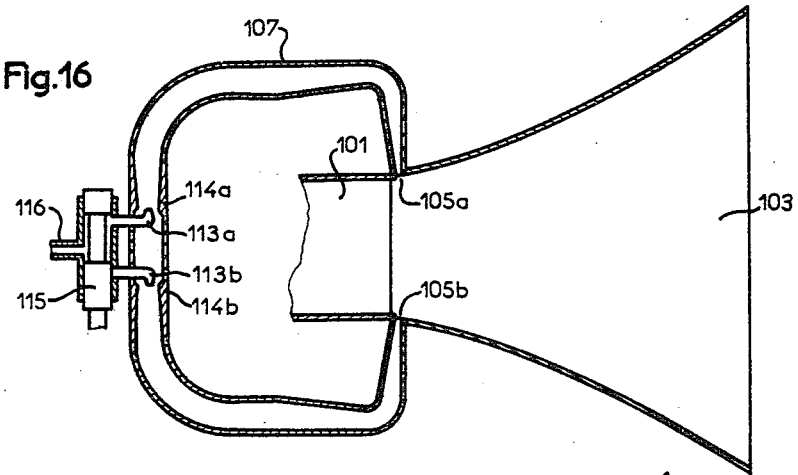
FIGURE 16 is a partial section showing details of an embodiment of the control system illustrated in FIGURE 15.
Figure 17:
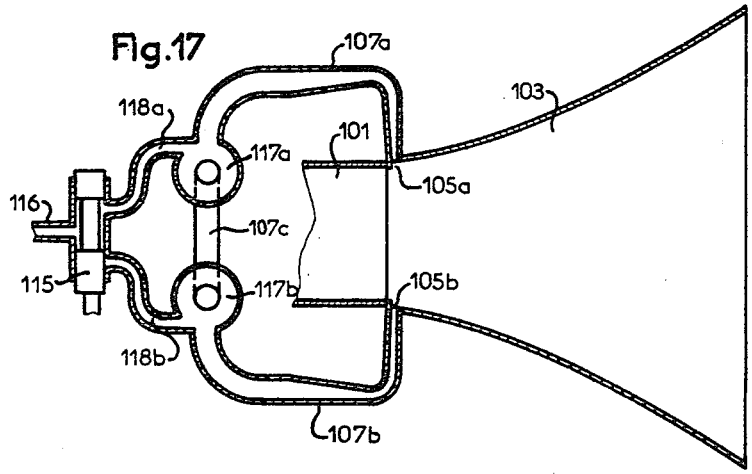
FIGURE 17 is a view similar to the preceding one but illustrating a modification of the control system.

FIGURES 15 to 17 represent two modifications of an assembly of the type described in connection with FIGURES 8 to 10 in which the permanent stream is added to the control jet inside the connecting conduit 107, whereas in the example given in FIGURE 13 it was superimposed on the latter opposite the control ports. This concept allows the suppression of individual conduits or at least simplification of the overall pipe system.

The device for controlling the flow of the biasing stream is inserted, at least partially, in the communication conduit 107 and is advantageously housed in a casing 112 lying next to the conduit or partly surrounding the latter.

FIGURE 15 illustrates the mounting of this casing whereas FIGURES 16 and 17 each show a device for the control of the flow of the permanent fluid stream.

In the embodiment illustrated in FIGURE 16, two injectors 113a and 113b have oppositely oriented discharge orifices located substantially on the central portion of conduit 107 extending parallel to the direction of the secondary or control flow. They are each associated with a convergent-divergent constriction 114a, 11b of the connecting conduit designed to increase, by suction or trompe effect, the momentum of the permanent biasing stream. The injectors are fed through a slide-valve distributor 115 by a central duct 116.

In this case, the permanent stream diminishes the adherence time of the jet on the wall towards which it is flowing, and, because of the suction or trompe effect, increases, at the same time, this adherence time for the other wall.

In this embodiment, the distributor could be replaced by a cascade of fluid amplifiers.

In the example of FIGURE 17, two opposed vortex chambers 117a, 117b are inserted in the connected conduit which comprises three portions 107a, 107b, 107c. They are supplied by a distributor 115 to which they are connected by their tangential inlet pipes 118a, 118b. When one of these chambers receives a biasing flow, the adherence time of the jet on the wall proximal to that chamber diminishes, whereas this time increases for the opposite wall.

Figure 18:
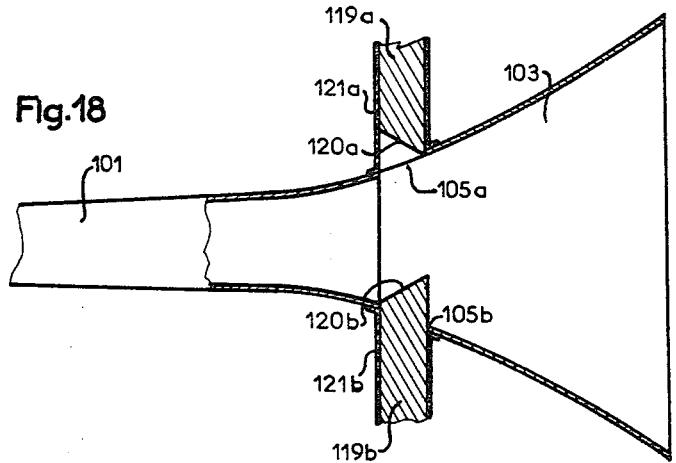
FIGURE 18 is a view similar to the two preceding figures but showing yet another embodiment.

FIGURE 18 illustrates an embodiment where the jet oscillation is controlled by mechanical means and not by auxiliary jets. Two sliders 119a, 119b each comprising a beveled deflecting edge 120a, 120b, project alternatively out of the control ports 105a, 105b and cause the stream to tilt over to the opposite wall. Their adjustment can be effected either mechanically or hydraulically.

Reference is now made to FIGURE 19 which is a performance diagram for a flattened nozzle, such as the nozzle 103 whose profile has a circular curvature of radius R (as shown in the schematic view) and which is joined to a conduit or nozzle such as the duct 101 having the transverse dimension $t$. In this diagram there are plotted on the ordinate the value of the ratio $R/t$ and on the abscissa the mach number M of the fluid flowing through the nozzle. The curve C bounds an upper zone I in which the nozzle operates satisfactorily. This curve has been drawn for a nozzle in which the angle $\alpha$ between the axis of its rearward extension 101 and the tangent to the profile of the nozzle at its junction with that extension has a value equal to zero. The curve would be different for other values of angle $\alpha$ which, generally, should remain below 11°.

It is obvious that modifications can be applied to the embodiments which have just been described, by the substitution of equivalent technical means, without, for that reason, departing from the scope of the present invention.

What is claimed is:

1. A system for controlling the attitude of a flying body adapted to roll about a longitudinal axis and to veer about another axis transverse thereto, comprising:
    at least one pair of thrust nozzles carried by said body on opposite sides of said longitudinal axis, said nozzles having individual axes defining a common axial plane with said longitudinal axis, each of said nozzles terminating in a flattened outlet with a major dimension perpendicular to said common axial plane;
    a source of propellant connected with each of said nozzles for discharging a fluid jet from said outlet, said jet having two stable positions adjacent opposite ends of said outlet spaced along said major dimension;
    control means for oscillating said jet of each of said nozzles in a swing plane perpendicular to said common axial plane defined by the individual nozzle axis and said major dimension, at a frequency substantially greater than the frequency of natural oscillations of said body about its center of gravity at the intersection of said longitudinal and transverse axis;
    and modulating means for concurrently varying the relative residence times of the jet of each of sair nozzles in said two stable positions thereof, thereby generating at each outlet an asymmetrical thrust with reference to said common axial plane.

2. A system as defined in claim 1, further comprising a second pair of nozzles substantially identical with those of said one pair and disposed on opposite sides of said longitudinal axis with their individual nozzle axes in a plane perpendicular to the common axial plane of said one pair, said second pair of nozzles being provided with a source of propellant, control means and modulating means substantially identical with those of said one pair.

3. A system as defined in claim 2 wherein said source of propellant comprises a reaction engine common to all said nozzles.

4. A system as defined in claim 2 wherein the outlets of said nozzles face the rear of said body and are disposed forwardly of the center of gravity thereof.

5. A system as defined in claim 1 wherein the swing planes of said nozzles diverge rearwardly from said longitudinal axis.

6. A system as defined in claim 5 wherein the inner wall surfaces of each nozzle are outwardly flared toward said opposite ends of its flattened outlet.

7. A system as defined in claim 6 wherein said inner wall surfaces are curved in said swing plane with a convex side toward the nozzle axis, the tangents to their curves at said outlet intersecting at a vertex point offset from said longitudinal axis whereby the rearward thrust of the jet in either of said stable positions has a direction skew to said longitudinal axis.

8. A system as defined in claim 1 wherein said control means includes conduit means opening into the nozzle at ports remote from said outlet disposed in said plane of swing on opposite sides of the nozzle axis, said modulating means comprising auxiliary fluid-supply means for introducing an asymmetrical biasing flow into said conduit means.

9. A system for controlling the attitude of a flying body adapted to roll about a longitudinal axis and to veer about two mutually perpendicular axes transverse thereto, comprising:
    a first pair of thrust nozzles carried by said body on opposite sides of said longitudinal axis and having individual axes defining a common axial plane with longitudinal axis and one of said transverse axes;
    a second pair of thrust nozzles carried by said body on opposite sides of said longitudinal axis and having individual axes defining a common axial plane with said longitudinal axis and the other of said transverse axes;
    a source of propellant connected with each of said nozzles for discharging a fluid jet therefrom, each of said nozzles having an outlet defining two stable positions for said jet on opposite sides of the corresponding common axial plane;
    control means for oscillating the jet of each of said nozzles between said two stable positions thereof;
    and modulating means for concurrently varying the relative residence times of the jet of each nozzle of either of said pairs in said two stable positions thereof, thereby generating at said outlet an asymmetrical thrust with reference to said common axial plane.

10. A system for controlling the attitude of a flying body, comprising:
    a thrust nozzle terminating in a flattened outlet with a major dimension and a substantially smaller minor dimension transverse to a central axis, said nozzle having a tubular inlet remote from said outlet;
    a source of propellant connected with said nozzle at said inlet for discharging a fluid jet from the latter, said jet having two stable positions adjacent opposite ends of said outlet spaced along said major dimension;
    conduit means opening into said nozzle at ports disposed between said inlet and said outlet on opposite sides of said central axis in a plane defined by said central axis and said major dimension for developing a secondary flow generating alternating pressure differentials to oscillate said jet in said plane between said stable positions;
    and auxiliary fluid-supply means for superimposing an asymmetrical biasing flow upon said secondary flow to modulate the oscillation of said jet with variation of its relative residence times in said stable positions, said nozzle having curved inner wall surfaces in said plane flaring outwardly from the region of said ports to said outlet along curves turning their convex sides to said central axis while being substantially tangent to said inlet in the region of said ports.

11. A system as defined in claim 10 wherein said auxiliary fluid-supply means comprises a pair of tubes opening into said conduit means in the region of said ports.

12. A system as defined in claim 10 wherein the tangent to said curves in the region of said ports includes with said central axis an angle ranging between 0° and 11°.

13. A system as defined in claim 10 wherein the curvature of said inner wall surfaces is substantially circular.

14. A system for controlling the attitude of a flying body, comprising:
- a thrust nozzle terminating in a flattened outlet with a major dimension and a substantially smaller minor dimension transverse to a central axis;
- a source of propellant connected with said nozzle at an inlet remote from said outlet for discharging a fluid jet from the latter, said jet having two stable positions adjacent opposite ends of said outlet spaced along said major dimension;
- conduit means opening into said nozzle at ports disposed between said inlet and said outlet on opposite sides of said central axis in a plane defined by said central axis and said major dimension for developing a secondary flow generating alternating pressure differentials to oscillate said jet in said plane between said stable positions;
- and auxiliary fluid-supply means for superimposing an asymmetrical biasing flow upon said secondary flow to modulate the oscillation of said jet with variation of its relative residence times in said stable positions, said conduit means comprising a connecting tube between said ports, said auxiliary fluid-supply means including a distributor with two alternate discharge lines terminating in oppositely oriented orifices within said connecting tube.

15. A system as defined in claim 14 wherein said connecting tube is formed with two converging-diverging internal constrictions just beyond said orifices.

16. A system for controlling the attitude of a flying body, comprising:
- a thrust nozzle terminating in a flattened outlet with a major dimension and a substantially smaller minor dimension transverse to a central axis;
- a source of propellant connected with said nozzle at an inlet remote from said outlet for discharging a fluid jet from the latter, said jet having two stable positions adjacent opposite ends of said outlet spaced along said major dimension;
- conduit means opening into said nozzle at ports disposed between said inlet and said outlet on opposite sides of said central axis in a plane defined by said central axis and said major dimension for developing a secondary flow generating alternating pressure differentials to oscillate said jet in said plane between said stable positions;
- and auxiliary fluid-supply means for superimposing an asymmetrical biasing flow upon said secondary flow to modulate the oscillation of said jet with variation of its relative residence times in said stable positions, said conduit means comprising a connecting tube between said ports, said auxiliary fluid-supply means including a distributor with two alternate discharge lines terminating in a pair of vortex chambers inserted in said connecting tube.

References Cited

UNITED STATES PATENTS

| | | | |
|---|---|---|---|
| 2,694,898 | 11/1954 | Stauff | 239—265.29 |
| 2,726,510 | 12/1955 | Goddard | 239—265.27 |
| 3,016,066 | 1/1962 | Warren | 137—81.5 |
| 3,158,166 | 11/1964 | Warren | 137—81.5 |
| 3,228,410 | 1/1966 | Warren et al. | 137—81.5 |
| 3,246,863 | 4/1966 | Posingies | 244—52 |
| 3,279,185 | 10/1966 | Lewis et al. | 239—265.23 |
| 3,325,103 | 6/1967 | Abbott | 239—265.17 |

MILTON BUCHLER, Primary Examiner

JAMES E. PITTENGER, Assistant Examiner

U.S. Cl. X.R.

239—265.13, 265.17; 244—78